W. R. CLARK.
VEHICLE BRAKE.
APPLICATION FILED OCT. 8, 1919.
1,380,772.
Patented June 7, 1921.
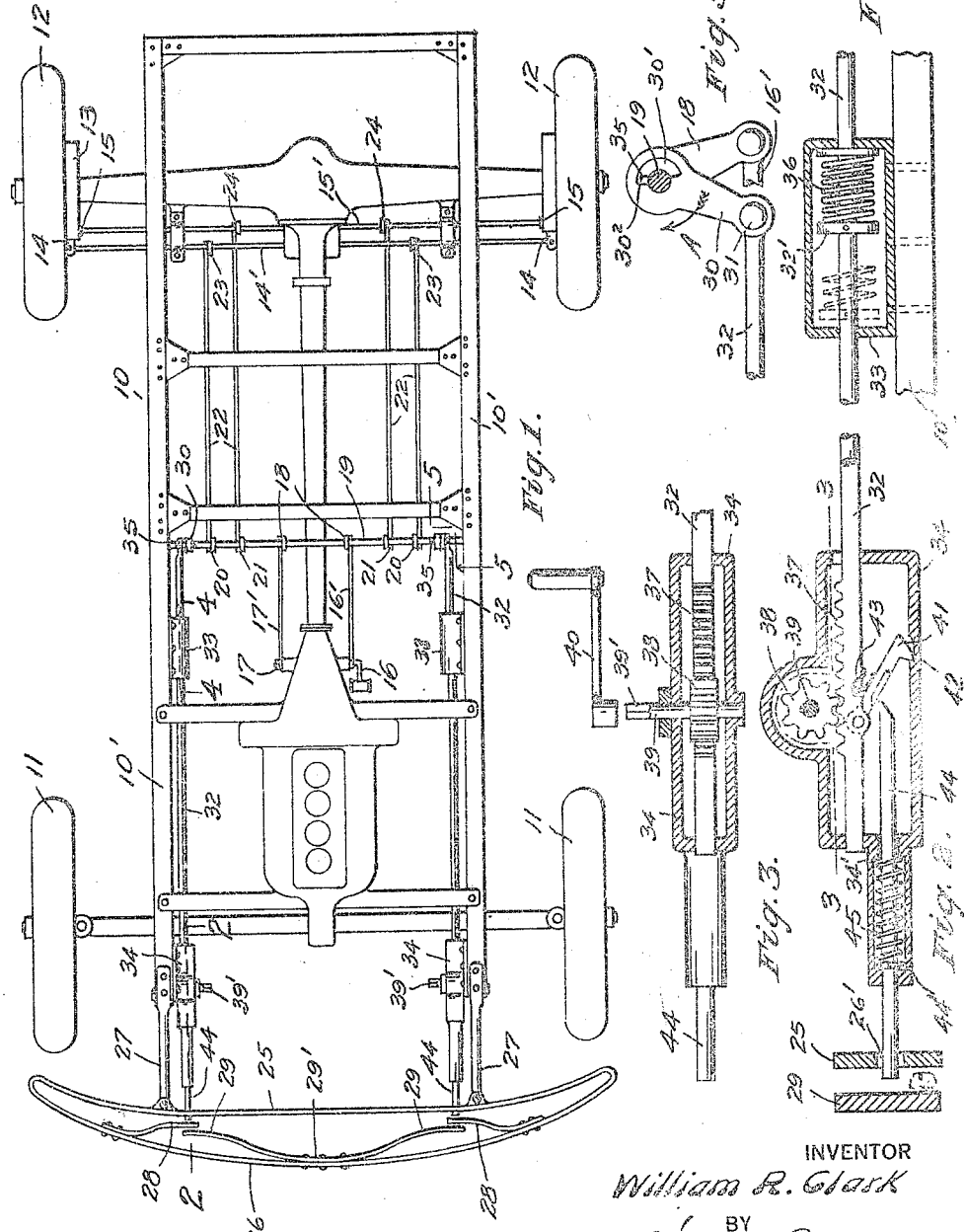
INVENTOR
William R. Clark
BY
ATTORNEY

UNITED STATES PATENT OFFICE.

WILLIAM R. CLARK, OF SEATTLE, WASHINGTON.

VEHICLE-BRAKE.

1,380,772. Specification of Letters Patent. Patented June 7, 1921.

Application filed October 8, 1919. Serial No. 329,183.

*To all whom it may concern:*

Be it known that I, WILLIAM R. CLARK, a citizen of the United States, residing at Seattle, in the county of King and State of Washington, have invented certain new and useful Improvements in Vehicle-Brakes, of which the following is a specification.

This invention relates to emergency brakes for motor driven vehicles.

The principal object of my invention is the provision of simple, inexpensive and efficient brake controlling devices for use in connection with an automobile bumper which upon encountering an object will serve to actuate brakes to cause the vehicle to be brought to a sudden stop.

A further object of the invention is the provision of means which are rendered operative by the application of the brakes to automatically lock the same in their engaged positions so that they can be released only after the consumption of considerable time and necessitating the services of a person upon the ground.

The invention consists in the novel construction and combination of devices as will be hereinafter described and claimed.

In the accompanying drawings, in which similar reference characters indicate corresponding parts in all the views,—

Figure 1 is a plan view of the chassis of an automobile with an embodiment of my invention applied thereto.

Fig. 2 is a detail sectional view through 2—2 of Fig. 1. Fig. 3 is a horizontal section through 3—3 of Fig. 2. Figs. 4 and 5 are sectional views through 4—4 and 5—5 of Fig. 1.

In the drawings, 10 represents the frame for an automobile body which is supported by the usual wheels 11 and 12. The traction wheels 12 at the rear of the frame are equipped with the brake drums 13.

14 and 15 represent brake shoes which are engaged and disengaged for ordinary road uses from the driver's seat (not shown) by means of a pedal 16 and a controlling lever 17, connected by reach rods $16^1$ and $17^1$ with arms such as 18, Fig. 5, depending from a rock shaft 19 which, in turn, is connected by arms 20, 21, reach rods 22 and arms 23, 24 with the brake shafts $14^1$ and $15^1$. The above mentioned parts are, or may be, similar to braking devices now in use.

According to the present invention, I provide in front of the frame 10, a bumper comprising a transverse rear member 25 and a front semielliptic member 26 joined at their ends. Said bumper is formed of resilient or spring metal and is secured from the rear member 25 by brackets 27 to the forward end of the frame 10.

Connected to the bumper member 26 adjacent to its ends are finger pieces 28 which are adapted to be engaged by horn elements 29 of a spring metal bar $29'$ secured at or about its midlength to the bumper member 26.

30 represents arms depending from the shaft 19 and connected by pivotal pins, such as 31 Fig. 5, with the rear ends of rods 32, one for each arm, which extend through casings 33 and 34 rigidly secured to the adjacent side rail $10^1$ of the frame.

The arms 30 are connected to the shaft 19 to afford limited independent rotary movements to the latter with respect to the arms 18 so as to enable the brakes to be ordinarily operated by means of the pedal or lever controls 16 and 17.

To which end the shaft 19 is provided at each arm 30 with a feather or lug 35 movable with the shaft in an arcuate recess $30^1$ (Fig. 5) of the arm but engageable by the end $30^2$ of the recess when the arm is swung in the direction indicated by arrow A.

A rod 32 interiorly of the respective casing 33 is provided with a collar $32^1$ to receive the thrust of a helical spring 36 which tends to yieldingly retain the rod to its forwardmost position. Within the respective casing 34, a rod 32 is provided with rack teeth 37 engageable by a spur pinion 38, Figs. 2 and 3, which is mounted upon a shaft 39 extending transversely through the casing and having a polygonal protruding end $39^1$ engageable in the hub of a crank handle 40.

41 represents a dog pivotally connected to a rod 32 and engageable against a stop 42 to hold the rod in its rearmost position in opposition to the respective spring 36.

A spring 43 is utilized to normally retain the dog 41 in its engagement with said stop. 44 represents a trip bolt extending from within proximity of a finger 28 through an aperture $26^1$ of the bumper part 25 into the casing 34, as shown in Fig. 2, and to within a short distance of the associated dog 41. As shown, a spring 45 interposed between a wall $34^1$ of the casing 34 and a collar $44^1$ on a bolt retains the latter out of contact with the dog so that the same will not be accidentally disengaged by reason of any vibratory movements of the bolt in the operation of the vehicles.

The operation of the invention is as follows: In a collision where the bumper strikes an object the bumper part 29¹ is pressed backwardly causing the horns 29 to strike against the bolts 44 and force the same against the respective dogs 41 to disengage them from the stops 42 thereby releasing the rods 32. When thus released the springs 36 assert themselves by pushing the rods 32 forward to accordingly actuate the arms 30 whereupon the brake mechanism is rendered operable to apply the brake shoes and stop the vehicle.

The referred to brake mechanism, it is to be noted, involves the hereinbefore described brake operating equipment such as employed on motor vehicles or any other suitable or well known apparatus.

When the brakes are applied through the medium of the present invention they cannot be disengaged from within the vehicle but only by the driver alighting or by some person on the ground who must manipulate by means of the crank 40 each of the spur gears 38 to successively restore the operating rods 32 into positions whereat the dogs 41 will engage the respective stops 42. Such releasing of the emergency brake operating appliances will therefore take considerable time so that the driver of the vehicle is compelled to remain for a while at the place of collision instead of being able to escape without giving the injured party or others an opportunity to arrest the responsible party or, at least, to obtain sufficient information for subsequent identification.

While I have described the invention in the form now preferred by me, various changes may be made therefrom without departing from the spirit of the invention and within the scope of the appended claims; for instance, instead of utilizing duplicate sets of actuating devices—one at each side of the frame—a single set or organization may be used and disposed as near the longitudinal axis of the vehicle as practicable.

What I claim, is—

1. In a motor vehicle, the combination with the usual wheel brakes and operating mechanism therefor including a rock shaft, and a manually operated brake lever connected to said rock shaft, and a resilient bumper attached to the front of the vehicle, of an arm connected to said rock shaft to afford limited rotary motion thereto with respect to said arm, a rod connected to said arm and provided with rack teeth, a spring connected to the rod and tending to actuate said arm for applying the brakes, a dog engaging said rod and serving to releasably retain the latter in inoperative position, means influenced by the bumper when colliding with an object to effect the disengagement of the dog from said rod, a gear wheel engaging with the rack teeth of said rod and manually actuated means for operating said gear wheel whereby the rod is moved in opposition to said spring into position to be engaged by said dog.

2. In a motor vehicle, the combination with the usual wheel brakes and operating mechanism therefor including a pedal and a controlling lever adapted to be employed selectively to apply the brakes, of a bumper comprising two transversely arranged resilient members disposed one in front of the other, brackets connecting the rearmost of said members to the vehicle frame for supporting the bumper, rods connected to said brake operating mechanism, springs connected to the respective rods and tending to render said rods operative, means for releasably securing said rods in operative positions, and yieldable devices engageable with the respective means, said devices being rendered operable by the bumper colliding with an object to cause said devices to act through the instrumentality of said means whereby the spring pressed rods are released to effect the applying of the brakes.

3. In a motor vehicle, the combination with the usual wheel brakes and operating mechanism therefor including a pedal and a controlling lever adapted to be employed selectively to apply the brakes, of a bumper comprising two transversely arranged resilient members disposed one in front of the other, brackets connecting the rearmost of said members to the vehicle frame for supporting the bumper, rods connected to said brake operating mechanism, springs connected to the respective rods and tending to render said rods operative, means for releasably securing said rods in operative positions, yieldable devices engageable with the respective means and extending through the rearmost of said bumper members, and means provided intermediate said bumper members and rendered operable by the bumper colliding with an object to cause said devices to act whereby the spring pressed rods are released by the aforesaid means to effect the applying of the brakes.

Signed at Seattle, Washington, this 2nd day of October, 1919.

WILLIAM R. CLARK

Witnesses:
PIERRE BARNES,
ELIZABETH JOHNSO